(12) United States Patent
Keller et al.

(10) Patent No.: US 7,823,539 B2
(45) Date of Patent: Nov. 2, 2010

(54) BOTTLE WITH HOSE FOR DISPENSING LIQUIDS FOR ANIMAL AND HUMAN CONSUMPTION

(76) Inventors: Pat Keller, 2340 Cambridge Ave., Cardiff, CA (US) 92007; Peter Chin, 1857 Bristol Ave., Westchester, IL (US) 60154

( * ) Notice: Subject to any disclaimer, the term of this patent is extended or adjusted under 35 U.S.C. 154(b) by 177 days.

(21) Appl. No.: 12/212,750

(22) Filed: Sep. 18, 2008

(65) Prior Publication Data

US 2010/0064976 A1    Mar. 18, 2010

(51) Int. Cl.
  *A01K 7/00* (2006.01)
(52) U.S. Cl. ........................................ 119/74
(58) Field of Classification Search .................. 119/74; 222/527, 526, 74, 482, 529, 530, 175; 220/710, 220/705, 203.29, 203.19, 203.01; 215/11.4, 215/11.1, 229, 389, 388, 387; 137/587
See application file for complete search history.

(56) References Cited

U.S. PATENT DOCUMENTS

| | | | | |
|---|---|---|---|---|
| 1,445,056 A | * | 2/1923 | Altenberg | 215/12.1 |
| 3,260,462 A | * | 7/1966 | Smaczny | 239/33 |
| 3,537,456 A | * | 11/1970 | Harautuneian et al. | 604/326 |
| 4,732,303 A | * | 3/1988 | Wang | 222/484 |
| 5,160,087 A | * | 11/1992 | Mandell | 239/33 |
| 6,293,226 B1 | * | 9/2001 | Hwang | 119/72 |
| 6,405,675 B1 | * | 6/2002 | Mills | 119/74 |
| 6,953,135 B2 | * | 10/2005 | Litton et al. | 224/414 |
| 2002/0170874 A1 | * | 11/2002 | Hou | 215/229 |
| 2005/0061814 A1 | * | 3/2005 | Jackel | 220/259.1 |
| 2005/0218165 A1 | * | 10/2005 | Yang | 222/526 |
| 2006/0113275 A1 | * | 6/2006 | Huang et al. | 215/387 |
| 2006/0113336 A1 | * | 6/2006 | Spencer | 224/148.2 |
| 2007/0034594 A1 | * | 2/2007 | Doucet et al. | 215/309 |

* cited by examiner

*Primary Examiner*—Rob Swiatek
*Assistant Examiner*—Ebony Evans
(74) *Attorney, Agent, or Firm*—Eric Hanscom; Todd J. Langford

(57) ABSTRACT

A bottle with a hose for dispensing liquid for animal or human consumption in a sanitized and convenient manner is disclosed. The bottle includes a hose that has one end connected to the bottom of the bottle with a length sufficient to wrap around the circumference of the bottle multiple times. A lever-actuated valve with a spout is connected to the other end of the hose for dispensing liquid into a tray and/or directly to an animal for consumption. The tray can be a base portion of the bottle, the cap of the bottle, or attached separately to the bottle or hose. Alternatively, multiple trays are included with the bottle. The lever-actuated valve may also be attached to a y-connector allowing for multiple spouts to dispense liquid simultaneously to multiple trays and/or directly to animals. A hose attachment secures the lever actuated valve end of the hose to the bottle.

18 Claims, 2 Drawing Sheets

BOTTLE WITH HOSE FOR DISPENSING LIQUIDS FOR ANIMAL AND HUMAN CONSUMPTION

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF THE INVENTION

Field of the invention: This invention relates to the general field of liquid containers, and more specifically to a bottle with a hose for dispensing liquid for animal or human consumption. The bottle includes a hose with a length sufficient to wrap around the bottle multiple times. One end of the hose is connected to the bottom of the bottle while a lever-actuated valve with a spout is connected to the other end for dispensing liquid into a tray or directly to an animal. The tray can be a base portion of the bottle, the cap of the bottle, or attached separately to the bottle or hose. Multiple trays may be included with the bottle. The lever-actuated valve may also be attached to a y-connector allowing for multiple spouts to dispense liquid simultaneously. A hose attachment secures the lever actuated valve end of the hose to the bottle. The cap of the bottle also includes a valve for dispensing liquids.

Many individuals enjoy hiking, going to the dog park, going to the beach, and other outdoor activities with their pets. To keep themselves hydrated, pet owners often take bottles of water. Keeping their pets hydrated, however, is a much more complex task. Pet owners can pour water out of the bottles as their pets lap it up, but this is an inefficient process as a considerable amount of water is not consumed by the pet and is therefore wasted. Alternatively, pets will drink out of any available water source, including any dog bowl, ponds, pools of water, or other standing water. Dogs usually share water at dog parks. Pets consuming water from these sources can lead to the spread of diseases. To refrain from wasting valuable water as well as aid their pets in consuming clean, fresh water, pet owners bring bowls or cups into which the water is poured. While this is more convenient for the pet, it is less convenient for the pet owner, as he or she must carry the bowl or cup with them wherever they go.

The prior art has made some attempts to solve this problem. U.S. Pat. No. 4,420,097, to Motsenbocker, discloses a portable liquid dispenser with carrying case. It has a thin, pillow-shaped container that includes an elongated tube with a valve and nozzle for containing and dispensing liquids. However, Motsenbocker does not teach an easy to clean bottle eliminating bacteria that has two separate valves for dispensing water to humans and animals as well as integrated trays or cups. Further, it is not in the shape of a bottle thereby making it more difficult to carry and handle.

U.S. Pat. No. 7,360,501, to Jacobsen, teaches a device for oral administration of fluids to an animal. It uses a container with a flexible tube, a nozzle, and a long pipe esophageal feeder that enters into the animal's throat. However, Jacobson does not teach a device that has two separate valves for dispensing water to humans and animals as well as integrated trays or cups.

U.S. Patent Application No. 2007/0034594, to Doucet et al., discloses a vented no-spill drinking bottle, bottle cap and associated bottle and pouch system. The device includes two openings, each with a valve, although one is intended to be a vent while the other dispenses fluid. However, Doucet et al. does not teach a device that as a tube long enough to wrap around the bottle multiple times. Further it does not teach integrated trays or cups that an animal can drink from.

Thus there has existed a long-felt need for a device that can dispense liquids to both animals and humans that includes a long hose. It should include an integrated tray or cup that an animal can drink from. There should be a valve at both the end of the hose as well as at the top of the bottle. Additionally, there should be a means to secure the hose to the bottle such that it can be quickly and easily secured to the bottle while not in use. The device should allow the pet owner to control the water distribution to his or her pets thereby limiting the possible spread of diseases to the pet.

The current invention provides just such a solution by having a bottle with a hose for dispensing liquid directly into the mouth or the tray for animal or human consumption. The bottle includes a hose with a length sufficient to wrap around the bottle multiple times. One end of the hose is connected to the bottom of the bottle while a lever-actuated valve with a spout is connected to the other end for dispensing liquid into a tray or directly to an animal. The tray can be a base portion of the bottle, the cap of the bottle, or attached separately to the bottle or hose. Multiple trays may be included with the bottle. The lever-actuated valve may also be attached to a y-connector allowing for multiple spouts to dispense liquid simultaneously. A hose attachment secures the lever actuated valve end of the hose to the bottle. The cap of the bottle can also include a valve for dispensing liquids.

SUMMARY OF THE INVENTION

The invention is a new and novel way of dispensing liquids to both animals and humans. It includes a bottle with a long hose that can wrap around the bottle multiple times. There is a means of attachment to secure the distal end of the long hose to the bottle. The distal end of the hose also includes a lever-actuated valve to dispense the liquid contained in the bottle. A y-connector can also be included before or after the valve to separate the flow of the liquid into multiple streams thereby enabling multiple users to drink from the liquid simultaneously. At the top of the bottle is a screw-on or snap-on cap with an integrated valve. This allows for a user to drink from the bottle as if it were a standard sport bottle. The screw-on or snap-on cap can also have a hinged or otherwise affixed lid. The current invention should also include an integrated tray or cup that can be used to hold liquid. The tray can be integrated into the bottle as a base that provides support and stability to the bottle. Alternatively, the tray can be a lid integrated into the cap of the bottle. The trays can be attached to the hose of the bottle or integrated into the end of the hose with a spout that dispenses liquid directly into the tray. Multiple trays can also be secured to the device to allow for the dispensing of liquid to multiple animals. The hose can also be used to warm the water on cold days. By directing the hose down the sleeve of a jacket worn by a user in winter months, the water is heated from the heat produced by the body before being dispensed.

It is a principal object of the invention to provide a bottle suitable for dispensing liquid to both animals and humans and is easy to carry in a bag or backpack.

It is another object of the invention to provide a bottle with multiple spouts to allow for the simultaneous dispensing of liquid.

It is an additional object of the invention to provide a bottle with integrated trays to aid in the dispensing of liquid to animals.

It is a final object of this invention to provide a bottle with a hose that has a length sufficient to allow a user to easily dispense liquid to animals as well as allow the user to drink liquid from the bottle herself.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

DETAILED DESCRIPTION OF THE INVENTION

Figure 1:
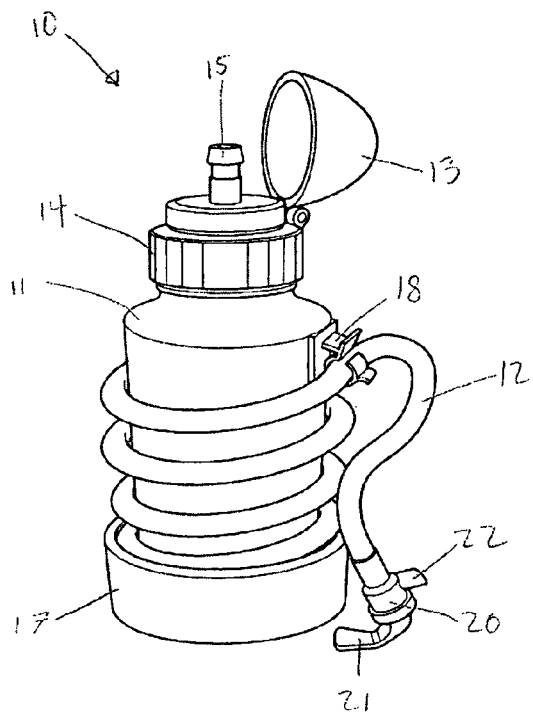
FIG. 1 is a perspective view of the current invention with an integrated base tray.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

FIG. 1 is a perspective view of the current invention with an integrated base tray. The current invention is a liquid dispensing bottle 10 that includes a bottle portion 11. A cap 14 can be screwed onto the top of the bottle 11. The cap 14 has a cap valve 15 that a user can open and close. When the cap valve 15 is open, the user is able to consume liquids from the bottle. A hinged lid 13, shown open in this figure, can be closed to surround the cap valve 15 thereby preventing accidental opening of the cap valve 15. A base tray 17 can be removably secured to the bottom of the bottle 11. The base tray 17 can be removed from the bottom of the bottle 11 and filled with a liquid to allow an animal to drink the liquid from the base tray 17. A hose 12 is connected to the bottom of the bottle 11 and is able to wrap around the bottle 11 multiple times. The end of the hose 12 not connected to the bottom of the bottle 11, known as the distal end, includes a lever-actuated valve 20. The lever-actuated valve 20 includes a lever 21 and a spout 22. When the lever 21 is depressed, the lever-actuated valve 20 is opened and liquid is dispensed from the spout 22. A hose clamp 18 secures the hose 12 to the bottle 18. In this figure, a portion of the hose 12 near the distal end is secured to the bottle 11 using the hose clamp 18.

Figure 2:
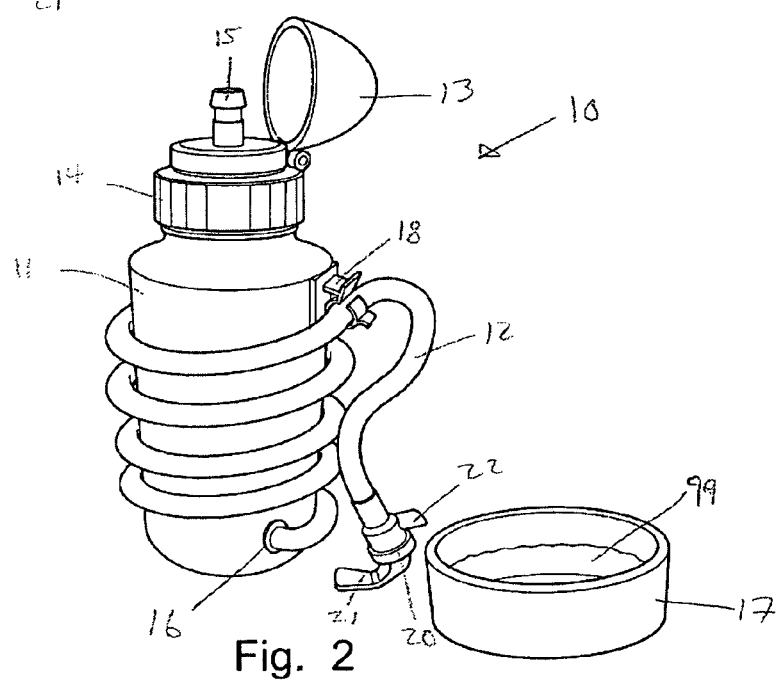
FIG. 2 is a perspective view of the bottle of FIG. 1 with the base tray separated from the bottle and filled with a liquid.

FIG. 2 is a perspective view of the bottle of FIG. 1 with the base tray separated from the bottle and filled with a liquid. A cap 14 can be screwed onto the top of the bottle 11. The cap 14 has a cap valve 15 that a user can open and close. When the cap valve 15 is open, the user is able to consume liquids from the bottle. A hinged lid 13, shown open in this figure, can be closed to surround the cap valve 15 thereby preventing accidental opening of the cap valve 15. A base tray 17 can be removably secured to the bottom of the bottle 11. The base tray 17 is shown removed from the bottom of the bottle 11 and filled with a liquid 99 to allow an animal to drink the liquid from the base tray 17. A hose 12 is connected to a hose attachment point 16 at the bottom of the bottle 11 and is able to wrap around the bottle 11 multiple times. The end of the hose 12 not connected to the bottom of the bottle 11, known as the distal end, includes a lever-actuated valve 20. The lever-actuated valve 20 includes a lever 21 and a spout 22. When the lever 21 is depressed, the lever-actuated valve 20 is opened and liquid is dispensed from the spout 22. A hose clamp 18 secures the hose 12 to the bottle 18. In this figure, a portion of the hose 12 near the distal end is secured to the bottle 11 using the hose clamp 18.

Figure 3:
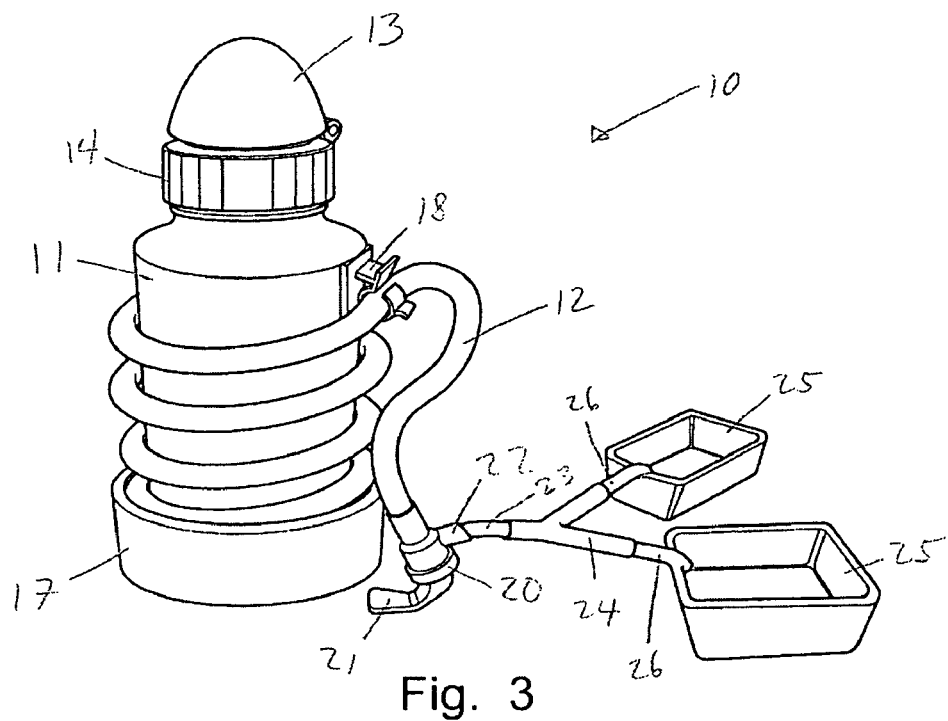
FIG. 3 is a perspective view of the current invention with a base tray and two hose-attached trays.

FIG. 3 is a perspective view of the current invention with a base tray and two hose-attached trays. A cap 14 can be screwed onto the top of the bottle 11. The cap 14 has a cap valve (not shown) that a user can open and close. A hinged lid 13, shown closed in this figure, can be opened provide access to the cap valve (not shown). A base tray 17 can be removably secured to the bottom of the bottle 11. The base tray 17 can be removed from the bottom of the bottle 11 and filled with a liquid to allow an animal to drink the liquid from the base tray 17. A hose 12 is connected to the bottom of the bottle 11 and is able to wrap around the bottle 11 multiple times. The end of the hose 12 not connected to the bottom of the bottle 11, known as the distal end, includes a lever-actuated valve 20. The lever-actuated valve 20 includes a lever 21 and a spout 22. When the lever 21 is depressed, the lever-actuated valve 20 is opened and liquid is dispensed from the spout 22. In this iteration of the invention, a spout hose 23 is connected to the spout 22. Connected to the spout hose 23 is a y-connector 24, which separates the flow of liquid from the spout 22 into two streams. Attached to each of the two separated streams of the y-connector 24 is a hose-attached tray 25. A tray spout 26 dispenses fluid from the spout 22 into the hose-attached tray 25. A hose clamp 18 secures the hose 12 to the bottle 18. In this figure, a portion of the hose 12 near the distal end is secured to the bottle 11 using the hose clamp 18.

Figure 4:
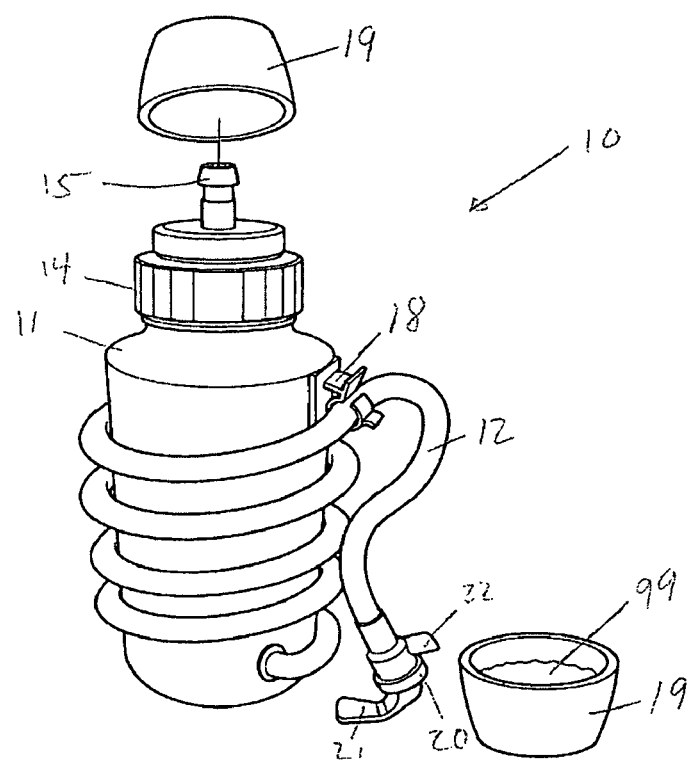
FIG. 4 is a perspective view of the current invention with a lid tray.

FIG. 4 is a perspective view of the current invention with a lid tray. A cap 14 can be screwed onto the top of the bottle 11. The cap 14 has a cap valve 15 that a user can open and close. When the cap valve 15 is open, the user is able to consume liquids from the bottle. A lid tray 19 can be secured to the cap 14 thereby preventing accidental opening of the cap valve 15. A hose 12 is connected to a hose attachment point 16 at the bottom of the bottle 11 and is able to wrap around the bottle 11 multiple times. The end of the hose 12 not connected to the bottom of the bottle 11, known as the distal end, includes a lever-actuated valve 20. The lever-actuated valve 20 includes a lever 21 and a spout 22. When the lever 21 is depressed, the lever-actuated valve 20 is opened and liquid is dispensed from the spout 22. A hose clamp 18 secures the hose 12 to the bottle 18. In this figure, a portion of the hose 12 near the distal end is secured to the bottle 11 using the hose clamp 18. In this figure, the lid tray 19 is also shown removed from the cap 14 and filled with a liquid 99 to allow an animal to drink the liquid from the lid tray 19.

The bottle is preferably made from a rigid or semi-rigid material, such as a plastic or metal. It can be transparent, translucent, or opaque. The bottle should be at least substantially watertight such that it can contain a liquid for extended periods of time. The cap is preferably screwed to the bottle by screwing the cap onto the bottle. The outside of the upper part of the bottle and the inside of the lower part of the cap are each threaded such that the two items can be screwed together. This allows a user to unscrew the cap to fill the bottle with liquids and replace the cap by screwing it back on to the bottle. However, it is nonetheless possible to attach the cap to the bottle using other means such as cap that snaps onto the bottle, a form-fitting cap with a rubber seal, and magnets. The cap could also be permanently sealed for a disposable version of the bottle.

The hose, spout hose, and y-connector are preferably made from a flexible material capable of transporting liquids from one location to another. The flexible material allows the hose to be wound and unwound around the bottle and for conveniently dispensing water from the bottle. As with the bottle, the hose can be transparent, translucent, or opaque. While one hose has been disclosed in the embodiments of the current invention, the inventor contemplates that multiple hoses with lever-actuated valves can be attached to the bottle.

The hose clamp can secure the hose to the bottle in various ways. As shown in the figures, the hose clamp can be a type of clip, preferably made of plastic, that substantially surrounds the hose to secure it to the bottle, but can be bent open to release and remove the hose from the hose clamp. Other means of securing a portion of the hose to the bottle are possible without departing from the scope of the current application, such as snaps, hook-and-loop fasteners, and magnets. It is also contemplated that multiple hose clamps be used to secure the hose to the bottle in multiple locations.

The trays described in this application should be made from a material that is capable of containing a liquid, such as metal or plastic. It can be transparent, translucent, or opaque. The base tray can be secured to the bottom of the bottle in various ways, including, but not limited to, internal and external threads such that the base tray can be screwed onto the bottom of the bottle, snaps, clips, hook-and-loop fasteners, magnets, and suction cups.

Various liquids can be used with the current invention, including, but not limited to, water, juice, sports drinks, and teas. Insulation can be included around the bottle to help keep cold liquids cold and hot liquids hot. The insulation can be proximate to the bottle and the hose wrapped around the insulation, or the entire liquid dispensing bottle can be placed inside of insulating material. Alternative configurations of insulation are possible without deviating from the scope of the current invention.

The current invention allows for an animal or human to consume liquids provided from the bottle. The cap valve can be opened and the bottle inverted to dispense a liquid into the mouth of the user. Alternatively, the hose can be unwound from the bottle and the lever of the lever-actuated valve depressed to dispense the liquid, so long as the lever-actuated valve is below the liquid level of the bottle. To dispense water to an animal, the hose can be unwound from the bottle and the lever of the lever-actuated valve depressed to dispense liquid into one of the integrated trays. Another means of dispensing liquid to an animal is to unwind the hose from the bottle and depress the lever of the lever-actuated valve and dispense liquid directly into the mouth of the animal. It is also possible that a liquid is dispensed from the lever-actuated valve without unwinding the hose from the bottle.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

We claim:

1. A device for dispensing fluids comprising
a bottle, a cap, a tray, and a hose,
where the bottle is a container that is capable of containing a liquid, where the bottle has a top and a bottom,
where the cap comprises a cap valve, where the cap can be secured to the top of the bottle, where the cap valve can be in an open position or a closed position, and where the cap valve, when in the open position, can dispense liquids contained within the bottle,
where the tray can be attached to the device, where the tray can be filled with a liquid to dispense liquid to an animal,
where one end of the hose is connected to the bottle, where the other end of the hose, known as the distal end, comprises a valve, where the valve can be in an open position or a closed position, where the valve, when in the open position, can dispense liquids contained within the bottle, and where the tray is attached to the distal end of the hose.

2. The device of claim 1, where the hose is of a sufficient length to wrap around the bottle multiple times.

3. The device of claim 1, further comprising a hose clamp, where the hose clamp is secured to the bottle, where the hose clamp can be used to secure a portion of the hose to the bottle.

4. The device of claim 1, further comprising a hinged lid, where the hinged lid is connected to the cap, where the hinged lid can be in an open position or a closed position, where the hinged lid, when in the open position, gives access to the cap valve, where the hinged lid, when in the closed position, prevents access to the cap valve.

5. The device of claim 1, further comprising insulation, where the insulation covers at least a portion of the bottle.

6. The device of claim 1, where the tray is a lid, where the lid is removably connected to the cap, where the lid can be secured over the cap valve, where the lid, when secured over the cap valve, prevents access to the cap valve.

7. The device of claim 1, further comprising two hose-attached trays, where each hose-attached tray is attached to the distal end of the hose.

8. The device of claim 7, further comprising a y-connector, a spout, and a spout hose, where the spout is connected to the valve, where the spout hose is connected to the spout, and where the y-connector is attached to the spout hose, and where each of the two hose-attached trays is connected to an end of the y-connector, whereby when liquid flows from the valve, it flows through the spout, spout hose, y-connector, and into each of the two-hose attached trays.

9. The device of claim 1, further comprising a spout, where the spout is connected to the valve of the hose, whereby when liquid flows from the valve of the hose, it flows through the spout.

10. The device of claim 1, where the tray can be removably secured to the bottom of the bottle.

11. A device for dispensing fluids comprising a bottle, a cap, a tray, and a hose,
where the bottle is a container that is capable of containing a liquid, where the bottle has a top and a bottom,
where the cap comprises a cap valve, where the cap can be secured to the top of the bottle, where the cap valve can be in an open position or a closed position, and
where the cap valve, when in the open position, can dispense liquids contained within the bottle,
where the tray can be attached to the device, where the tray can be filled with a liquid to dispense liquid to an animal, where one end of the hose is connected to the bottom of the bottle, where the other end of the hose, known as the distal end, comprises a valve and a spout, where the valve is a lever actuated valve, where the valve can be in an open position or a closed position, where the valve, when in the open position, can dispense liquids contained within the bottle, where the spout is connected to the valve, whereby when liquid flows from the valve, it flows through the spout, where the hose is of a sufficient length to wrap around the bottle multiple times, and where the tray is attached to the distal end of the hose.

12. The device of claim 11, further comprising a hose clamp, where the hose clamp is secured to the bottle, where the hose clamp can be used to secure a portion of the hose to the bottle.

13. The device of claim 11, further comprising a hinged lid, where the hinged lid is connected to the cap, where the hinged lid can be in an open position or a closed position, where the hinged lid, when in the open position, gives access to the cap valve, where the hinged lid, when in the closed position, prevents access to the cap valve.

14. The device of claim 11, further comprising insulation, where the insulation covers at least a portion of the bottle.

15. The device of claim 11, where the tray is a lid, where the lid is removably connected to the cap, where the lid can be secured over the cap valve, where the lid, when secured over the cap valve, prevents access to the cap valve.

16. The device of claim 11, further comprising two hose-attached trays, a y-connector, a spout, and a spout hose, where each hose-attached tray is attached to the distal end of the hose, where the spout hose is connected to the spout, and where the y-connector is attached to the spout hose, and where each of the two hose-attached trays is connected to an end of the y-connector, whereby when liquid flows from the valve, it flows through the spout, spout hose, y-connector, and into each of the two-hose attached trays.

17. The device of claim 11, where the tray can be removably secured to the bottom of the bottle.

18. A device for dispensing fluids comprising
a bottle, a cap, a tray, and a hose, and a hose clamp,
where the bottle is a container that is capable of containing a liquid, where the bottle has a top and a bottom,
where the cap comprises a cap valve, where the cap can be secured to the top of the bottle, where the cap valve can be in an open position or a closed position, and
where the cap valve, when in the open position, can dispense liquids contained within the bottle,
where the tray can be attached to the device, where the tray can be filled with a liquid to dispense liquid to an animal,
where one end of the hose is connected to the bottom of the bottle, where the other end of the hose, known as the distal end, comprises a valve and a spout, where the valve is a lever actuated valve, where the valve can be in an open position or a closed position, where the valve, when in the open position, can dispense liquids contained within the bottle, where the spout is connected to the valve, whereby when liquid flows from the valve, it flows through the spout, where the hose is of a sufficient length to wrap around the bottle multiple times, and where the tray is attached to the distal end of the hose,
where the hose clamp is secured to the bottle, where the hose clamp can be used to secure a portion of the hose to the bottle.

* * * * *